United States Patent [19]

Hayashi

[11] Patent Number: 5,159,476
[45] Date of Patent: Oct. 27, 1992

[54] LIQUID CRYSTAL DISPLAY UNIT HAVING LARGE IMAGE AREA AND HIGH RESOLUTION

[75] Inventor: Yuji Hayashi, Kanagawa, Japan
[73] Assignee: Sony Corporation, Tokyo, Japan
[21] Appl. No.: 458,397
[22] Filed: Dec. 28, 1989

[30] Foreign Application Priority Data

Dec. 28, 1988 [JP] Japan .................. 63-331341
Dec. 28, 1988 [JP] Japan .................. 63-331342
Dec. 28, 1988 [JP] Japan .................. 63-331344

[51] Int. Cl.$^5$ .................. G02F 1/13; G09G 3/36
[52] U.S. Cl. ............................ 359/54; 359/59; 359/53
[58] Field of Search .............. 350/334, 333, 332, 335; 340/784; 359/54, 59, 53

[56] References Cited

U.S. PATENT DOCUMENTS

| | | | |
|---|---|---|---|
| 4,582,395 | 4/1986 | Morozumi | 350/333 |
| 4,839,707 | 6/1989 | Shields | 350/334 |
| 4,842,371 | 6/1989 | Yasuda et al. | 350/333 |
| 4,922,240 | 5/1990 | Duwaer | 340/784 |
| 4,928,095 | 5/1990 | Kawahara | 340/784 |
| 4,936,656 | 6/1990 | Yamashita et al. | 350/334 |
| 4,938,566 | 7/1990 | Takeda et al. | 350/333 |
| 4,968,119 | 11/1990 | Stewart | 350/334 |
| 4,973,135 | 11/1990 | Okada et al. | 340/784 |
| 5,012,228 | 4/1991 | Masuda et al. | 350/339 F |
| 5,021,774 | 6/1991 | Ohwada et al. | 340/784 |

FOREIGN PATENT DOCUMENTS 0103523 3/1984 European Pat. Off. .
0276340 8/1988 European Pat. Off. .
0279171 8/1988 European Pat. Off. .
3113041A1 1/1982 Fed. Rep. of Germany .

OTHER PUBLICATIONS

"A Color LC Panel Using a Very Thin Film Transistor (V-TFT), 1985 International Display Research Conference" Tooru Sakai et al., pp. 30-31, IEEE.

Primary Examiner—Rolf Hille
Assistant Examiner—S. V. Clark
Attorney, Agent, or Firm—Hill, Van Santen, Steadman & Simpson

[57] ABSTRACT

A liquid crystal display unit is provided wherein address lines for two mutually adjacent odd and even rows of pixels arrayed in a matrix are in common, and two vertical pixels on each column can be displayed simultaneously to enable display of an image corresponding to one frame. Capacitor forming electrode wires are supplied with a fixed potential are disposed between omitted rows of address lines eliminated due to the common use thereof, whereby the storage capacitors are of a sufficiently high value, even with a high resolution display, to enhance the image quality of the liquid crystal display unit. Since a fixed potential is applied to the capacitor forming electrode wire which forms the storage capacitor, the capacitor does not apply a load to the address line and thereby consistently insures a fast operation. As a result, improvements can be achieved relating to large image area and high resolution. Furthermore, each pixel includes a switching transistor which is composed of a thin film transistor having a high carrier mobility and is formed under a single line so that even when the on-resistance of the transistor is lowered, the aperture ratio of the pixel is still enhanced to obtain a high resolution.

18 Claims, 10 Drawing Sheets

LIQUID CRYSTAL DISPLAY UNIT HAVING LARGE IMAGE AREA AND HIGH RESOLUTION

BACKGROUND OF THE INVENTION

1. Field of the Invention

The present invention relates generally to a liquid crystal display unit having a plurality of pixels arrayed in a matrix.

2. Description of the Related Art

Figure 8:
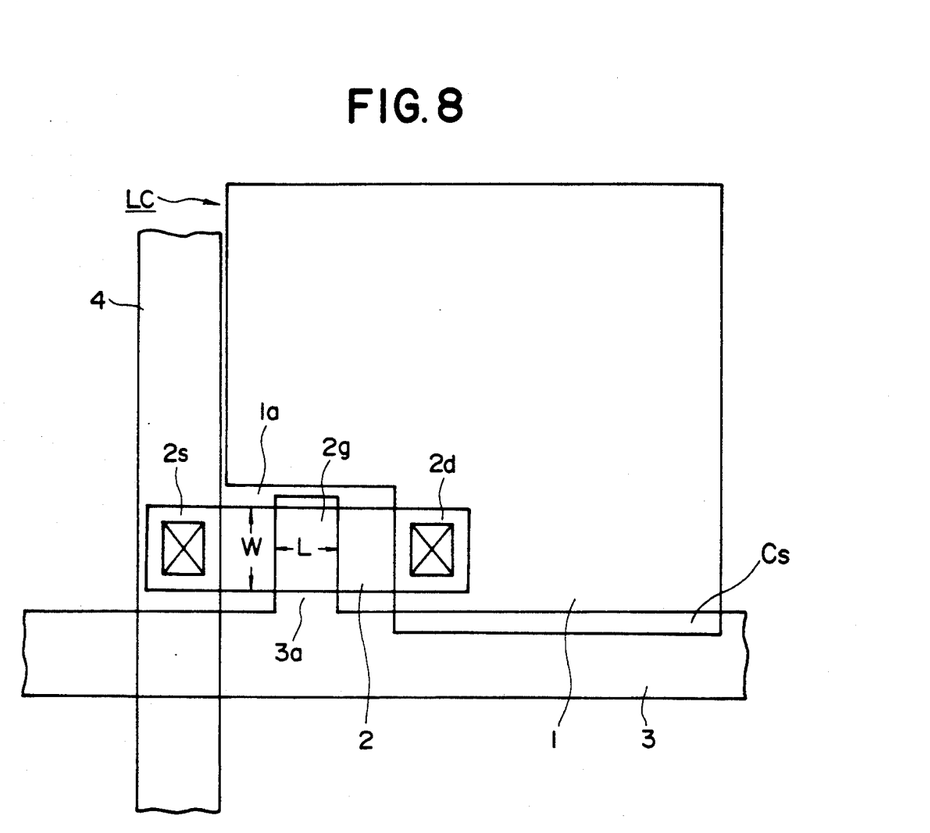
FIG. 8 is a plan view of one pixel or liquid crystal cell of a liquid crystal display unit.

A single pixel in a liquid crystal display panel is schematically illustrated in FIG. 8, which corresponds generally to Japanese Patent No. 63-41708. In FIG. 8, the pixel, also referred to as a liquid crystal cell LC, includes a transparent pixel electrode 1, the pixel electrode 1 being formed on a transparent substrate which, along with a second transparent substrate, sandwiches a liquid crystal material therebetween. A switching thin-film transistor 2 is provided for driving the pixel electrode 1; an address line 3 is provided for selecting a row of individual pixels and is located between rows of pixel electrodes 1; and a signal line 4 which is disposed between columns of the pixel electrodes 1 supplies an image signal to the electrodes. Each thin film transistor 2 is provided with a drain 2d that is connected to the pixel electrode 1, a source 2s that is connected to the signal line 4, and a gate 2g that is connected to the address line 3.

Figure 9:
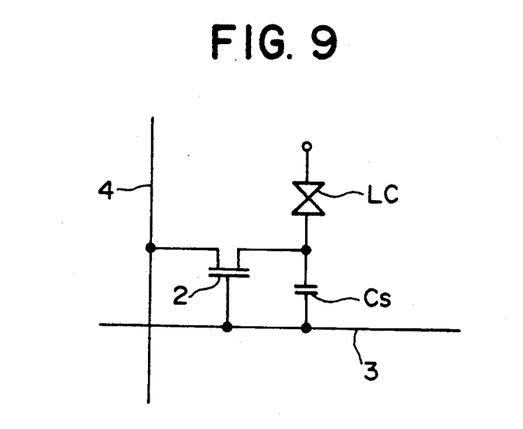
FIG. 9 is an equivalent circuit diagram of the liquid crystal cell of FIG. 8.

In FIG. 9 is shown an equivalent circuit for each pixel, or liquid crystal cell, LC. In a liquid crystal display panel, it is necessary to add a storage capacitor Cs for each of the pixels LC to improve image quality. The capacitance value of the storage capacitor Cs is to be maximized to prevent flicker. The storage capacitor Cs may be produced by superimposing the pixel electrode 1 on a portion of the address line 3 or on a portion of the signal line 4 with an interlayer insulator film positioned therebetween. In the example illustrated in FIG. 8, the storage capacitor Cs is formed between the pixel electrode 1 and the address line 3.

At present, technical development in liquid crystal display panels is directed toward achieving a larger image area and a higher resolution. However, as the pixel pitch is decreased for enhanced resolution, it become impossible to obtain a sufficiently large capacitance value of the storage capacitor Cs produced by superimposing the pixel electrode 1 on the address line 3 or on the signal line 4 as described above. To achieve a sufficiently great capacitance value, there may be contrived a means for producing an exclusive electrode wire for the capacitance alone so as to form a storage capacitor Cs of desired value between the pixel electrode and such exclusive wire. Since such exclusive electrode wire can be supplied with a fixed potential, it is not affected in a harmful way by any potential variation in the address line relative to the signal line to eventually obtain enhancement of the image quality. However, to realize such exclusive electrode wire producing means without changing the aperture rate, or aperture ratio, of the pixel, the exclusive electrode wire for the capacitor Cs needs to be composed of a transparent material or the like. This unfortunately increases the number of steps in the manufacturing process and results in disadvantages with respect to yield rate and production cost.

Referring again to FIG. 8, the pixel electrode 1 is provided with a square setback 1a in a portion where the thin film transistor 2 is formed. The drain 2d of the thin film transistor 2 is connected to the pixel electrode 1 and the source 2s is connected to the signal line 4 in such a way that the thin film transistor 2 bridges the square setback 1a in the pixel electrode 1. The gate 2g of the transistor 2 is connected to a contact portion 3a which extends from the address line 3 toward the square setback 1a.

Generally, in a liquid crystal display unit comprising a plurality of pixels arrayed in a matrix with switching transistors, it is necessary to lower the on-resistance of the switching transistor 2 for supplying a signal to the liquid crystal cell LC during the selection period.

In liquid crystal display units where thin film transistors 2 are composed of amorphous silicon or polycrystalline silicon for use as switching transistors, the mobility of charge carriers is low so that a ratio W/L of channel width W to channel length L (as shown if FIG. 8) is set to a relatively great value to lower the on-resistance of the thin film transistor 2. Accordingly, this enlarges the area of the thin film transistor 2 and results in a decrease in the area of the pixel portion which leads to a decrease in the aperture rate, or aperture ratio, of the pixels. Thus, the attempt to reduce pixel area while enhancing resolution consequently fails.

SUMMARY OF THE INVENTION

It is an object of the present invention to achieve a large image area at a high resolution in a liquid crystal display unit.

Another object of the invention raises the aperture rate, or aperture ratio, of the pixels while lowering the on-resistance of the switching transistor to consequently attain a high resolution in a liquid crystal display unit.

These and other objects and advantages of the invention are realized in a liquid crystal display unit including a plurality of matrix-arrayed pixels, or liquid crystal cells, LC each having a switching transistor Tr and an additive capacitor, or storage capacitor, Cs. The liquid crystal display unit of the present invention is formed so that the switching transistors for the pixels on two mutually adjacent rows X1 and X2, X3 and X4 . . . are connected in common to the same address line 13, while the switching transistors for the mutually different alternate pixels on each column Y are connected in common to the same signal lines 12a, 12b, respectively. A common capacitor-forming electrode wire 14 for the pixels on the other two adjacent rows is provided between the address lines 13, in other words between the other mutually adjacent rows X2 and X3, X4 and X5 and so forth. The additive storage capacitor Cs for each pixel is formed of the electrode wire 14, an insulator film 16a formed therebelow, and a conductor layer 15A. The electrode wire 14 for the additive storage capacitor Cs is formed of the same layer as the address line 13. The structure of the present display unit may be modified so that the capacitor forming electrode wire 14, the conductor layer 15a and the insulator layer 16a extend partially under the signal lines 12a and 12b.

The above-described liquid crystal display unit has an adequate number of pixels or cells LC for displaying an image of one frame, wherein two vertical pixels corresponding to an odd row and an even row are selected simultaneously and driven in a non-interlaced mode to display the image. The switching transistors Tr for the pixels on two mutually adjacent rows X1 and X2, X3 and X4, and so forth are connected in common to the same address line 13 so that the number of address lines 13 is reduced to half. A common capacitor-forming electrode wire 14 for the two mutually adjacent pixels is provided simultaneously between the address lines 13, i.e. between the rows X2 and X3, X4 and X5 and so forth where the address lines are omitted. Thus, an additive storage capacitor Cs is formed in the region where the electrode wire 14 is provided so that a sufficiently great capacitance value can be achieved in the storage capacitor Cs without changing the aperture ratio of the pixel. In other words the additive storage capacitor Cs has a sufficiently great value despite a decrease in the pixel pitch.

Due to the application of a fixed voltage potential to the electrode wire 14, the additive storage capacitor is prevented from becoming a load on the address line 13. Therefore, fast operation of the display unit is possible while providing the advantages of a large image display area and high resolution. In addition to the above advantages, since the storage capacitor does not become a load on the address line, the load on the driver for the vertical scanner is reduced to possibly simplify the driver circuit.

The electrode wire 14 for the additive storage capacitor Cs is formed by using the same layer as the address line 13, and both the conductor layer and the insulator layer for the additive storage capacitor Cs are formed by using extensions of the semiconductor thin film of the transducer and an extension of the gate insulator film thereof. Thus, the present capacitor can be formed without requiring additional steps in the manufacturing process.

Furthermore, the present invention provides that each of the switching transistors is composed of a thin film or an ultra thin film transistor 2 having a high carrier mobility and is formed under a signal line 4. It is therefore possible to form the address lines 3 linearly while providing transistors 2 under the signal lines 4, hence enhancing the aperture ratio of the pixel to achieve a maximum permissible value with respect to the design rule. This becomes even more effective in display units having a decrease in pixel area with progression toward a higher resolution.

DESCRIPTION OF THE PREFERRED EMBODIMENTS

In a liquid crystal display unit, flicker is normally conspicuous unless the pixels in the display unit are rewritten per field. For this reason, in a liquid crystal display panel having, for example, 400 vertical pixels to display television signals corresponding to one frame, all of the pixels are rewritten per field by the use of a field memory, for example, to prevent the occurrence of flicker (15Hz) from alternate driving of the liquid crystal cells. In other words, the signal display is driven in a non-interlaced mode.

Figure 5:
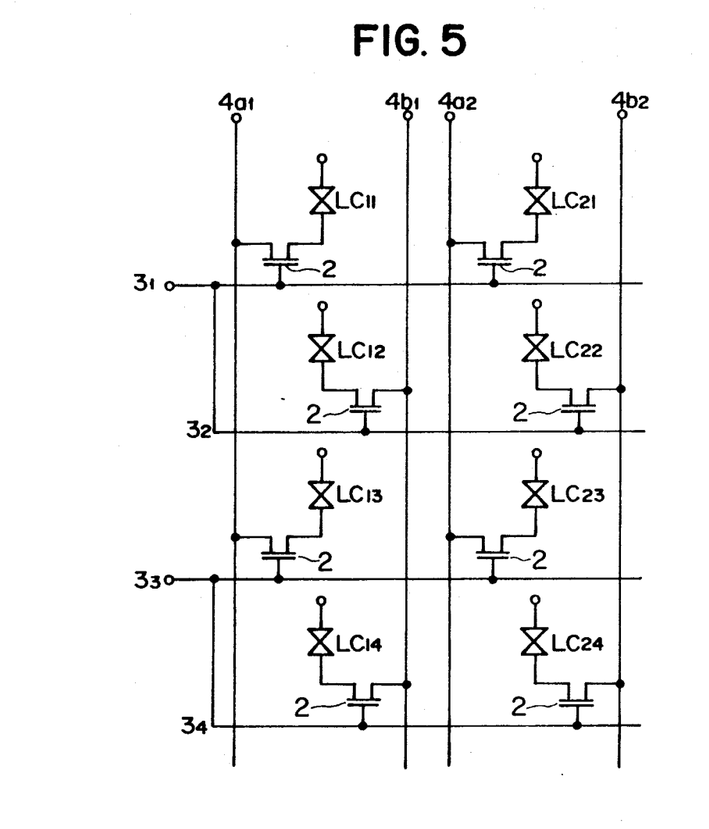
FIG. 5 is an equivalent circuit diagram of a liquid crystal display unit used to explain the principles of the present invention.

With reference to the equivalent circuit diagram of FIG. 5, two signal lines $4a$ and $4b$ (for example the signal lines $4a1$, $4b1$; $4a2$, $4b2$; ...) are provided for each column of pixels or liquid crystal cells LC. The odd alternate pixels LC11, LC13, ...; LC21, LC23, ... ; etc. in each column are connected in common to a corresponding signal line $4a$ for that column, while the even alternate pixels LC12, LC14, ...; LC22, LC24 ... ; and so forth in each column are connected in common to the other signal line $4b$. Address lines $3_1$, $3_2$, $3_3$, $3_4$, ... are provided for the individual rows of pixels. Driving of the pixels LC is performed so that two address lines $3_1$ and $3_2$, $3_3$ and $3_4$, ... corresponding to an odd row and an even row are selected simultaneously, and signals of an odd field and an even field are supplied simultaneously to the two signal lines $4a$ and $4b$ to execute sequential selective display of two vertical pixels LC11 and LC12, LC21 and LC22, ...; LC13 and LC14, LC23 and LC24, ... and so forth. Therefore, when such driving method is adopted, the address lines for the mutually adjacent odd row and even row pixels are rendered common to each other.

Figure 6:
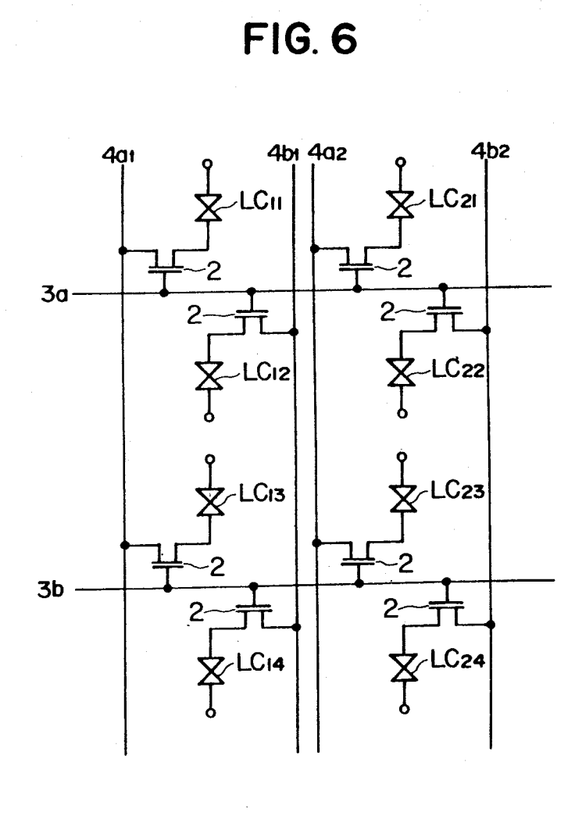
FIG. 6 is an equivalent circuit diagram of another liquid crystal display unit for explaining the principles of the invention.

As shown in FIG. 6, this same non-interlaced drive can be accomplished with the address lines $3a$, $3b$, ... disposed between alternate rows of pixels. Thus, it becomes possible to reduce the number of address lines by half. In view of the pattern layout, transparent pixel electrodes LC need to be spaced apart from each other. In the present invention, the address lines are disposed in the alternate inter-row spaces so their number is reduced to half. An additive storage capacitor is formed by a combination of an electrode wire disposed between the other alternate rows where the address lines are omitted and an extension of a gate insulator film of the transistor and an extension of the semiconductor thin film of the transistor. A fixed potential is then applied to the electrode wires.

Hereinafter, an exemplary liquid crystal display panel according to the present invention will be described with reference to FIGS. 1-3. The example represents the application of the invention to a liquid crystal display panel designed for displaying a frame image with, for example, 400 vertical pixels.

EXAMPLE 1

Figure 1:
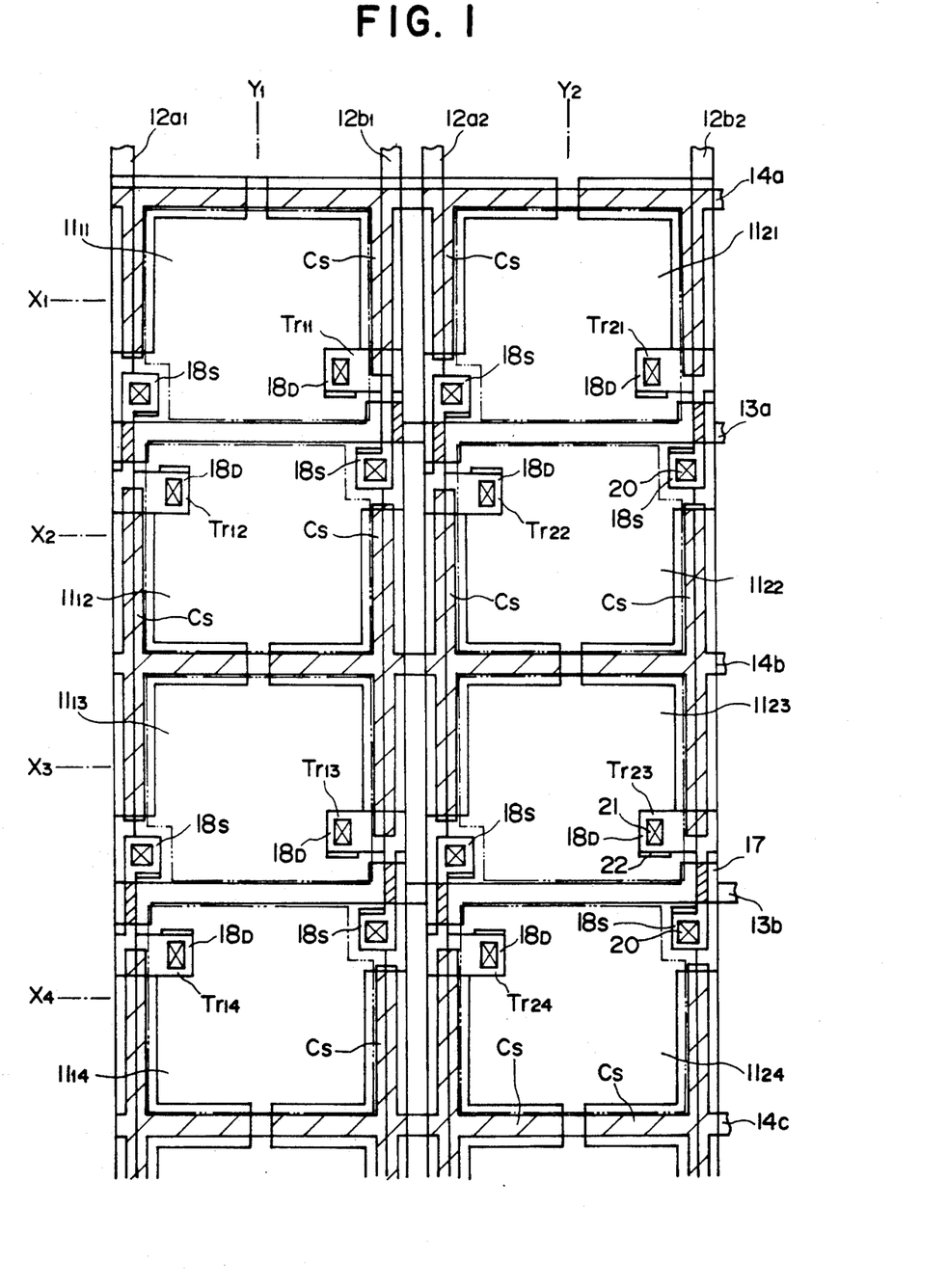
FIG. 1 is a schematic plan view of an exemplary liquid crystal display unit embodying the principles of the present invention.
Figure 2:
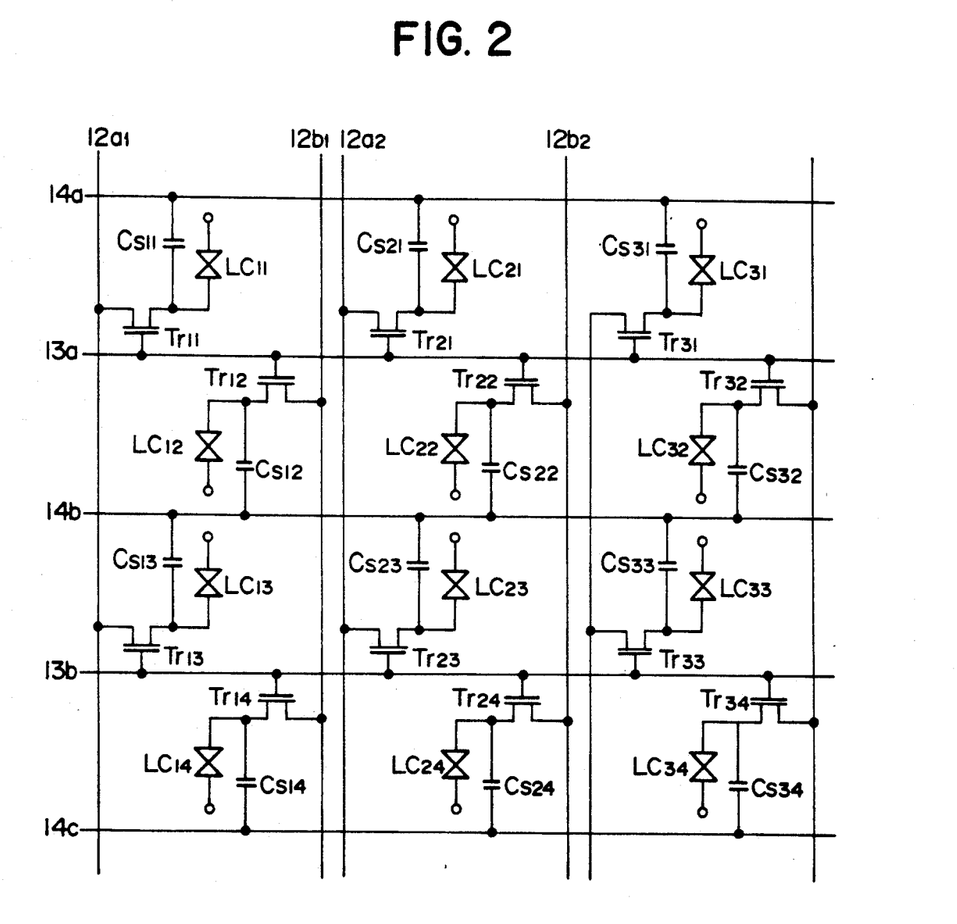
FIG. 2 is an equivalent circuit diagram of the liquid crystal display unit shown in FIG. 1.

In FIG. 1 is shown transparent pixel electrodes 11, such as the electrodes $11_{11}$, $11_{12}$, $11_{13}$, $11_{14}$, ... $11_{21}$, $11_{22}$, $11_{23}$, $11_{24}$, ..., which are composed, for example, of indium-tin oxide (ITO) or the like and which form pixels or liquid crystal cells LC. The electrodes 11 are arrayed in a matrix at predetermined intervals.

Signal lines 12a, and 12b, such as the signal lines 12a1, 12b1; 12a2, 12b2; ..., are composed of aluminum and one pair of the signal lines 12a and 12b are disposed between columns Y, such as the columns Y1, Y2, ..., of the pixel electrodes 11 in such a manner as to sandwich each column Y.

Address lines 13, such as the address lines 13a, 13b, ..., are disposed between two mutually adjacent rows such as the rows X1 and X2, X3 and X4, .... Switching transistors Tr, such as the transistors Tr11, Tr12, Tr13, Tr14, ... Tr21, Tr22, Tr23, Tr24, ..., are of a thin film type for driving the pixel electrodes $11_{11}$, $11_{12}$, $11_{13}$, $11_{14}$, ... $11_{21}$, $11_{22}$, $11_{23}$, $11_{24}$, .... In other words, the switching transistors Tr drive the pixels or liquid crystal cells LC11, LC12, LC13, LC14, ... LC21, LC22, LC23, LC24, ... and so forth. The switching transistors Tr are arranged corresponding to the individual intersections of the signal lines 12a and 12b and the address lines 13.

Electrode wires 14, such as the electrode wires 14a, 14b, 14c, ... for storage capacitors Cs are disposed above the row X1 of the pixel electrode 11, between the other two mutually adjacent rows X2 and X3, between rows X4 and X5, ... and so forth in common to such adjacent rows. The electrode wires 14 are also referred to herein as capacitor forming electrode wires. In the present embodiment, each electrode wire 14 is disposed along the space between the two rows and extends to under the signal lines 12a and 12b as well.

Figure 3A:
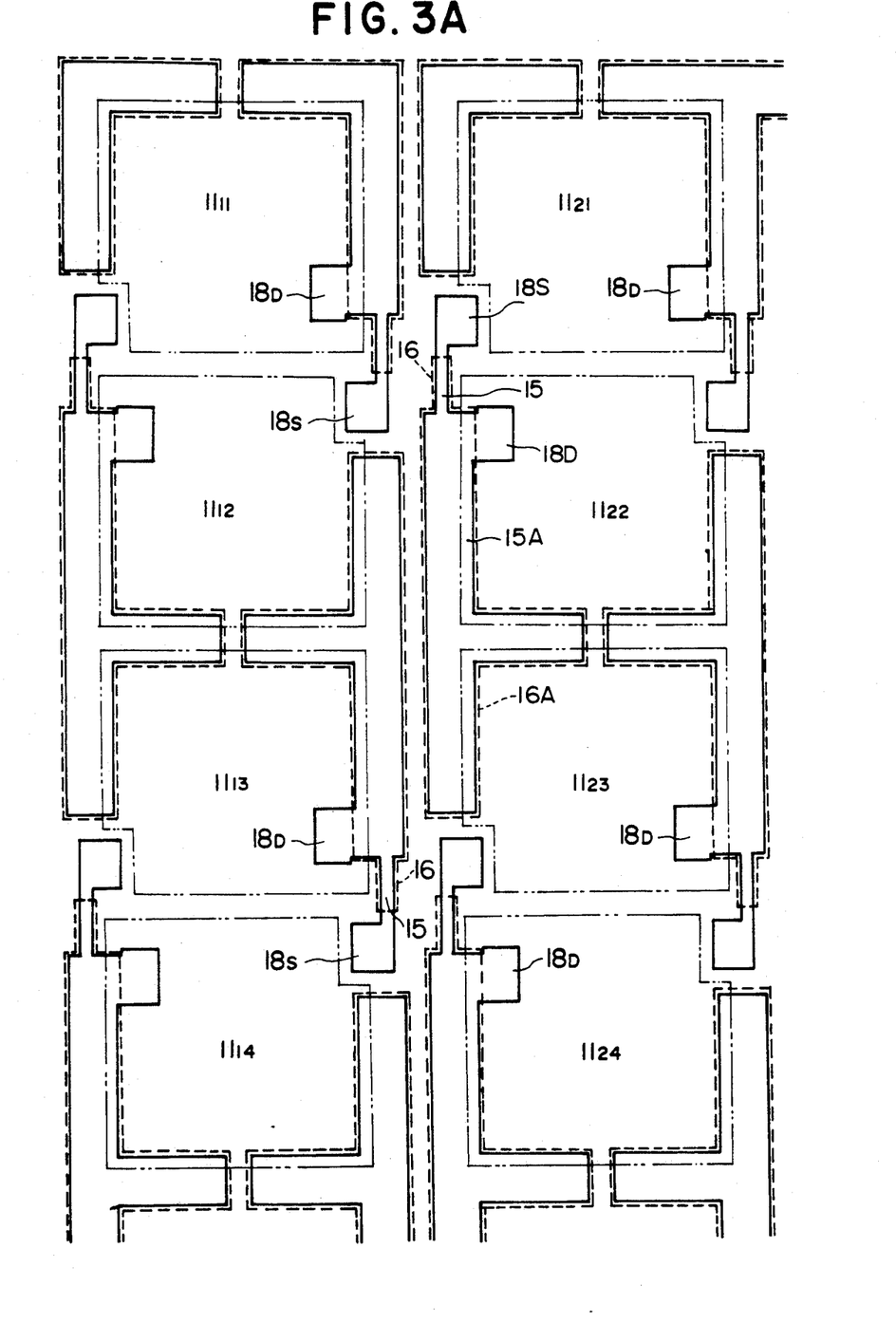
FIG. 3A is a schematic diagram showing a pattern layout of a first-layer semiconductor thin film and gate insulator film for the exemplary liquid crystal display unit of FIG. 1.
Figure 3B:
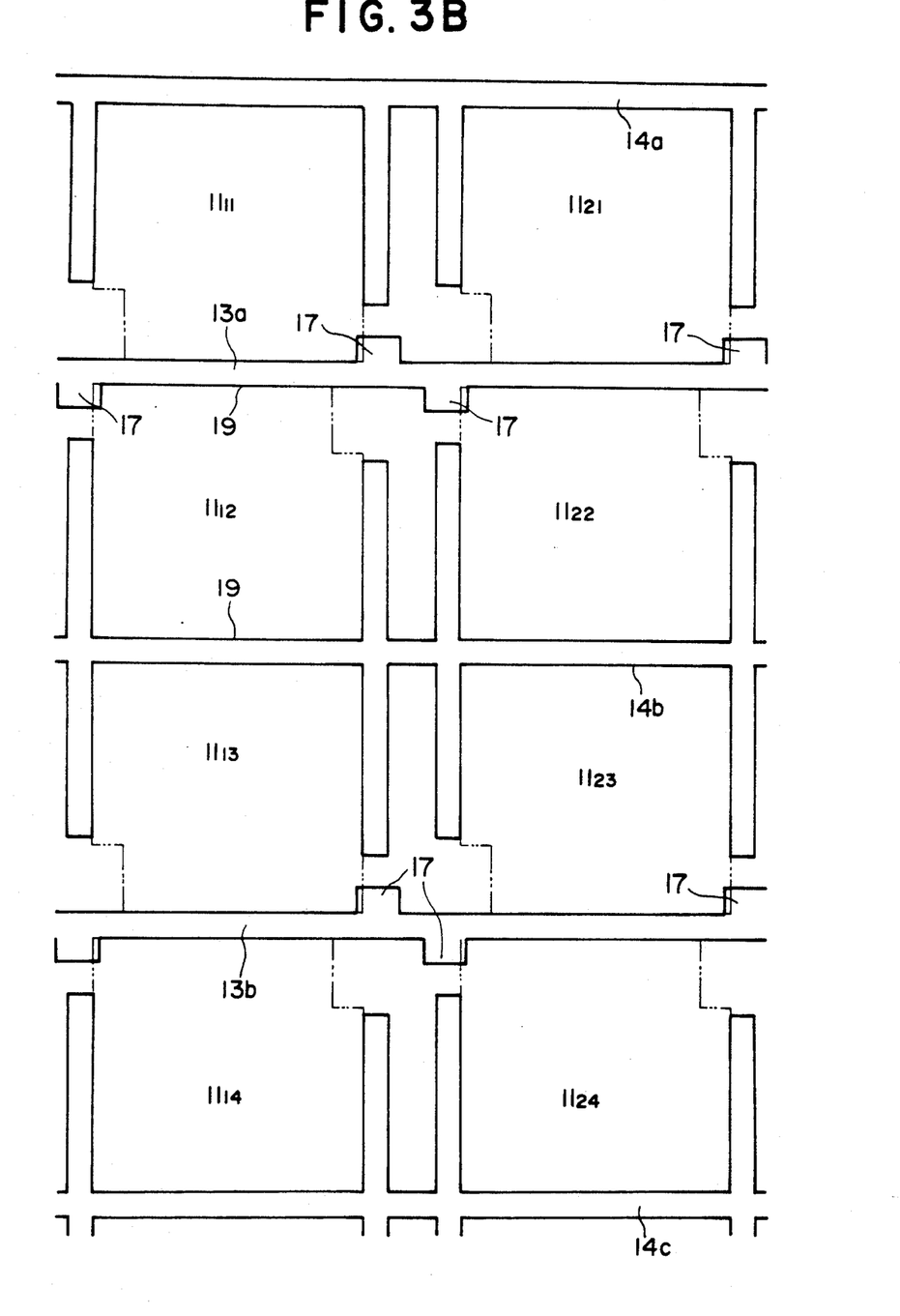
FIG. 3B is a schematic diagram of a pattern layout of address lines and capacitor forming electrode wires for the liquid crystal display unit of FIG. 1.
Figure 3C:
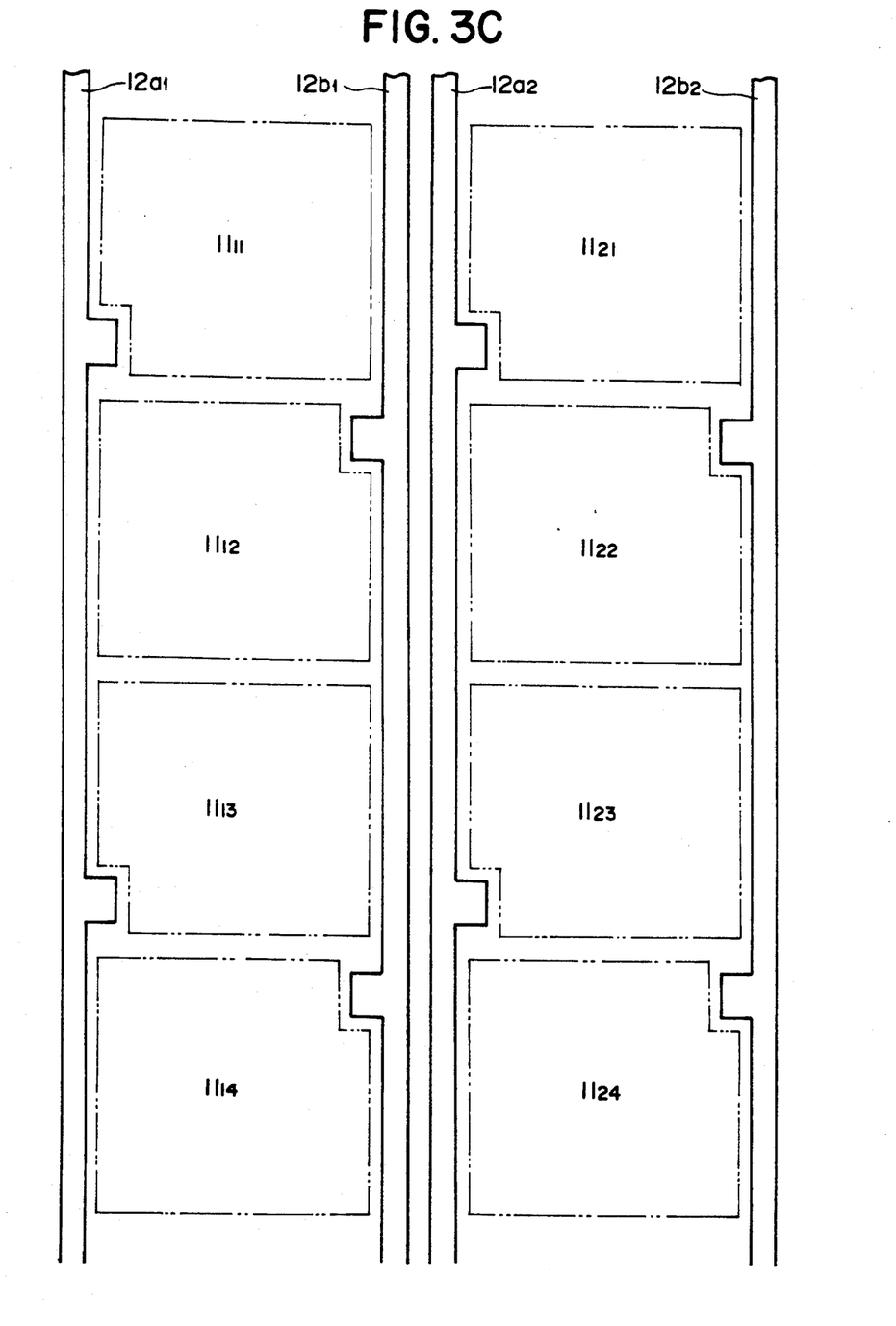
FIG. 3C is a schematic diagram of a pattern layout of signal lines for the exemplary liquid crystal display unit.
Figure 3D:
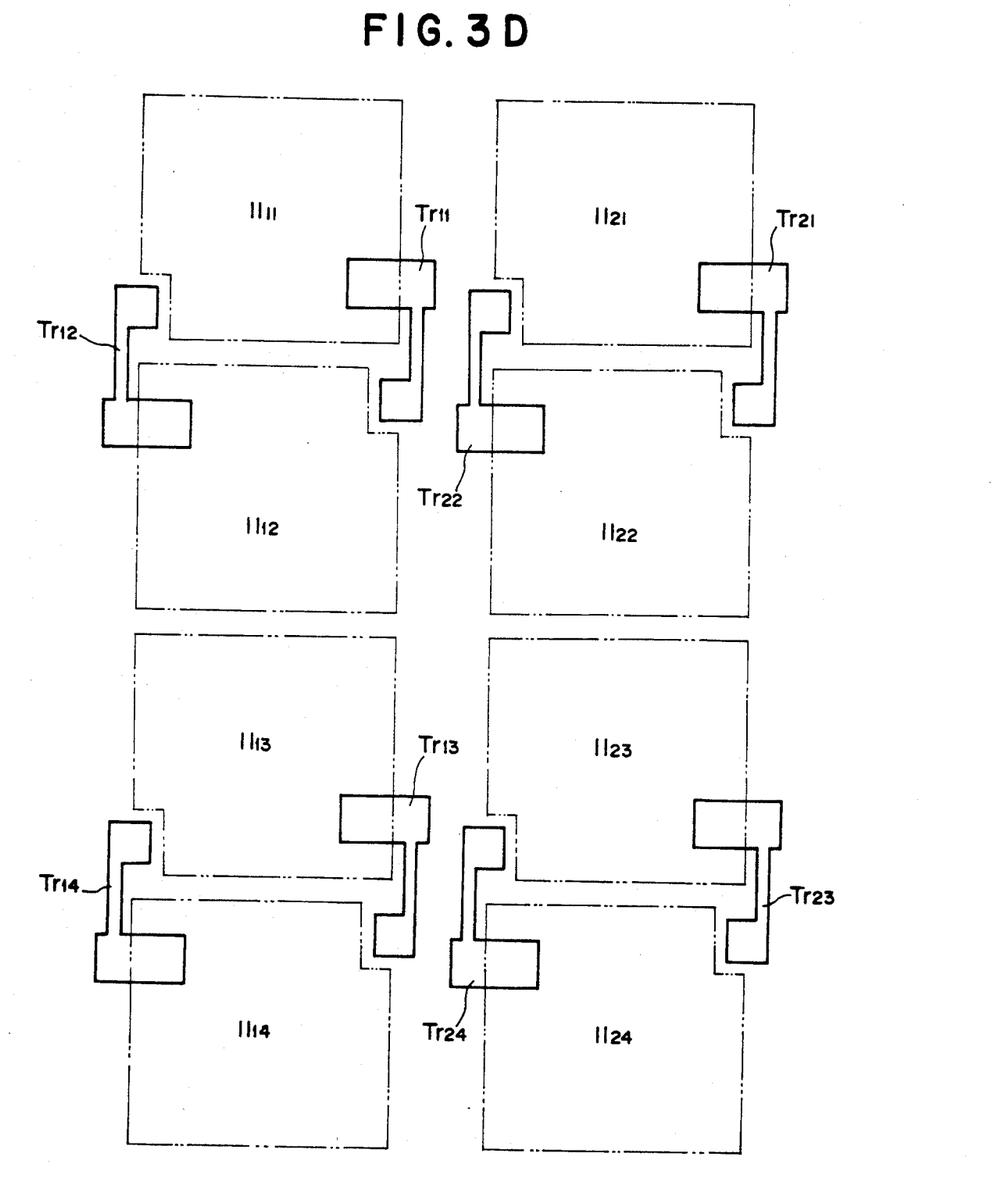
FIG. 3D is a schematic diagram of a pattern layout of thin film transistors for the exemplary liquid crystal display unit.

Referring now to FIGS. 3a through 3d, the thin film transistor Tr includes a semiconductor thin film 15, shown in FIG. 3a, composed of a first-layer polycrystalline silicon film or amorphous silicon film formed on an insulator substrate and of a gate electrode 17, shown in FIG. 3b, composed of a second layer polycrystalline silicon film 19 obtained by doping a semiconductor layer with an impurity or impurities which is formed on a gate portion of the semiconductor thin film 15 through a gate insulator film 16 composed of silicon dioxide (SiO$_2$) or the like. Furthermore, two portions on both sides of the gate electrode 17 of the semiconductor thin film 15 are formed as a source region 18S and a drain region 18D (shown in FIG. 3A). The thin film transistor Tr is formed so that at least its gate is present under the signal lines 12a and 12b. The pattern layout of the thin film transistors Tr is illustrated in FIG. 3D.

The step of forming a semiconductor thin film 15 to constitute each of the thin film transistor Tr provides that a substantially T-shaped semiconductor thin film extension 15A is formed integrally therewith in a manner to extend from a drain region 18D along the capacitor forming electrode wire 13 and the signal lines 12a and 12b. The step of forming the gate insulator film 16 provides that a gate insulator film extension 16a is simultaneously formed, the extension 16A extending over the entire surface of the semiconductor thin film extension 15A integrally with the film 16. The pattern layout of the semiconductor thin films 15 and the gate insulator films 16 is illustrated in FIG. 3A.

The address lines 13 connected to the gate electrodes 17 are shown in FIG. 3B and are composed of impurity doped polycrystalline silicon 19 as is the gate electrodes 17. In the step of forming the address lines 13, the address line 13a is formed so that it is connected in common with the gate electrodes 17 of the transistors Tr11, Tr12, Tr13, ... on row X1 and also to the gate electrodes 17 of the transistors Tr12, Tr22, Tr32, ... on the row X2. Similarly, the address line 13b is formed so that it is connected in common with the gate electrodes 17 of the transistors Tr13, Tr23, Tr33, ... on row X3 and also to the gate electrodes 17 of the transistors Tr14, Tr24, Tr34, ... in row X4. Similarly, the address line 13c is formed to be connected in common with the gate electrodes of the transistors Tr on the two rows.

The electrode wires 14 such as the wires 14a, 14b, 14c, ..., for the storage capacitors Cs are composed of impurity-doped polycrystalline silicon 19 and are formed simultaneously with the gate electrodes 17 and the address lines 13, as shown in FIG. 3b. In this step, the capacitor forming electrode wires 14a are formed so that they are connected in common to the storage capacitors Cs11, Cs21, Cs31, ... corresponding to the pixels Lc11, Lc21, Lc31, on the first row X1; and the capacitor forming electrode wire 14b is formed so that it is connected in common with the storage capacitors Cs12, Cs22, Cs32, ... and to the storage capacitors Cs13, Cs23, Cs33, ... corresponding respectively to the pixels LC12, LC22, LC32, ... and LC13, LC23, LC33 ... on the second and third rows X2 and X3. Similarly, the successive capacitor forming electrode wires 14 are formed so that they are connected in common to the respective storage capacitors in rows X4 and X5, X6 and X7, and so forth. The capacitor forming electrode wire 14 is formed on the gate insulator film extension 16A. FIG. 3B illustrates the pattern layout of the gate electrodes 17, the address lines 13 and the impurity-doped polycrystal silicon layers 19 constituting the capacitor forming electrode wires 14.

The pairs of signal lines 12a and 12b of aluminum for the individual columns Y1, Y2, ... of pixels LC are connected in common to the transistors of alternate pixels in one column and to the transistors of alternate pixels of the other column. That is, the signal line 12a1 is connected in common to the source region 18S of the transistors Tr12, Tr14, Tr16, ... of alternate pixels LC12, LC14, LC16, ... on row Y1. The signal line 12b1 is connected in common to the source regions 18S of the transistors Tr11, Tr13, Tr15, ... of the other alternate pixels LC11, LC13, LC15, ... and so forth. Similarly, the signal line 12a2 is connected in common to the source regions 18S of the transistors Tr22, Tr24, Tr26, ... of alternate pixels LC22, LC24, LC26, in row Y2; and the signal line 12b2 is connected in common to the source regions 18S of the transistors Tr21, Tr23, Tr25, ... of the other alternate pixels Lc21, LC23, LC25, ... and so forth. Also, the successive signal lines 12a and 12b are formed simultaneously. As shown in FIG. 1, contact portions 20 are provided for each source region 18s with the corresponding signal line 12a or 12b. The pattern layout of the signal lines 12a and 12b are shown in FIG. 3C.

Each of the pixel electrodes 11 is composed of indium-tin oxide (ITO) and is connected partially to the drain region 18D of the corresponding transistor Tr. During the step of applying the pixel electrodes, the pixel electrode 11 is connected through an aluminum electrode 22 to a contact portion 21 of the drain region 18D. The storage capacitor Cs for each pixel LC is formed of a first layer semiconductor thin film extension 15A extending from the semiconductor thin film 15 of the transistor Tr and of an electrode wire 14 composed of a second-layer impurity-doped polycrystal silicon film 19. Preferably, a fixed voltage potential is applied to the capacitor forming electrode wire 14.

Although not specifically shown, a transparent insulator substrate having transparent electrodes on its entire inner surface is provided opposite the transparent insulator substrate upon which the above-described thin film transistors Tr, storage capacitors Cs and pixel electrodes 11 are formed, and a liquid crystal material is sealed between the two substrates to constitute the liquid crystal display panel.

In the above-described liquid crystal display panel, the two respective vertical pixels LC11 and LC12, LC21 and LC22, ... corresponding to the two odd and even rows X1 and X2, X3 and X4, ... are selected simultaneously by the use of a field memory or the like in a non-interlaced drive mode to display a television image of one frame. In the liquid crystal display panel, the address lines of the two rows X1 and X2, X3 and X4, ... are in common with each other by one address line 13a, 13b, ... individually. Common electrode wires 14, such as electrode wire 14a, 14b, 14c, ... for the storage capacitors Cs, are disposed above the row X1, between the two rows X2 and X3, between the rows X4 and X5, ... and are omitted as mentioned above.

The storage capacitors Cs are formed with the electrode wires 14, the semiconductor thin film extension 15A corresponding to each pixel and the gate insulator film extension 16A whereby a sufficiently great capacitance value is obtained for the capacitor Cs even in display panels which achieve high resolution. The storage capacitors Cs are formed between the rows of the pixels electrodes 11 with an extension under the signal line to insure an increase in the capacitance value. The storage capacitors Cs are thus formed between the rows of pixel electrodes 11 and are further extended to be under the signal line when necessary to reach a greater value, hence averting impairment of the aperture ratio of the pixels.

Since a fixed potential is applied to the electrode wires 14, the storage capacitor Cs is not a load on the address line 13. Therefore, fast operation is possible as are the further advantages of insuring a large image display area and a high resolution. Moreover, the driver for the vertical scanner can be reduced to eventually simplify the circuit of the scanner.

The electrode wire 14, the gate insulator film extension 16A, and the semiconductor thin film extension 15A constituting the storage capacitor Cs are formed simultaneously with the gate electrode 17, the gate insulator film 16A and the semiconductor thin film 15 of the transistor Tr, respectively. Therefore, the formation of the storage capacitors Cs are carried out without any additional steps in the manufacturing process.

The address lines are thus in common for driving two pixels simultaneously, and there is formed in the resultant gap an electrode wire 14 which is composed of an impurity-doped polycrystalline silicon layer of a relatively great thickness and with a light shielding property so that none of the backlight is permitted to pass through the gap during the display, hence preventing deterioration of the contrast. Although the electrode wire 14 for the storage capacitor Cs in the foregoing embodiment is composed of impurity-doped polycrystalline silicon, it may also be composed of other proper materials in view of the desire for contrast in the display, such as aluminum having a light shielding property.

EXAMPLE 2

Figure 4:
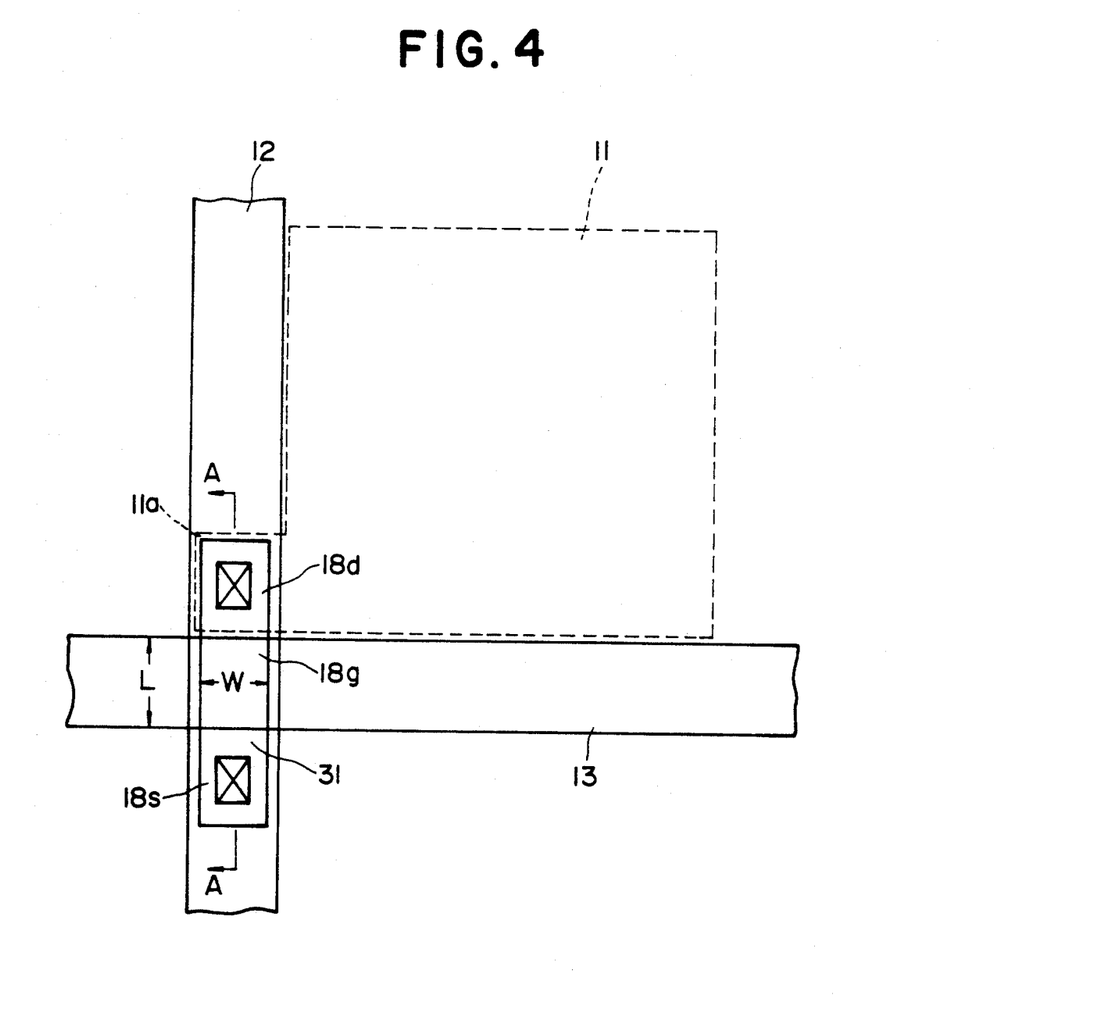
FIG. 4 is a schematic plan view of a single pixel or liquid crystal cell of another embodiment according to the present invention.

In FIG. 4 is shown a structure of one pixel in a second embodiment of a liquid crystal display panel embodying the principles of the invention. In the diagram of FIG. 4, a transparent pixel electrode 11 is part of the pixel or liquid crystal cell LC. Also included is a switching ultrathin film transistor 31 for driving the pixel LC, an address line 13 disposed between rows of the pixel electrodes 11 for selecting a row of individual pixels, and a signal line 12 disposed between columns of the pixel electrodes 11 for supplying an image signal.

Since the ultrathin film transistor 31 has a high carrier mobility, this requirement can be met if the ratio W/L of channel width W to channel length L is small with reduction of the on-resistance, whereby the transistor 31 can be of an oblong shape. In this embodiment, therefore, signal lines 12 and address lines 13 are formed to be linear as illustrated in FIG. 4, and the pixel electrodes 11 are of a shape extending partially under the signal lines 12 continuously with the square regions enclosed by the address lines 13 and the signal lines 12. The oblong ultrathin film transistors 31 having a small ratio W/L and a high carrier mobility are formed under the intersections of the signal lines 12 and the address lines 13. The preferred thin film transistors have a thickness of 100–750 Å to give high mobility, as compared to the prior art thin film transistos having a thickness of about 1500 Å.

A drain 18d of the ultrathin film transistor 31 is connected to a portion 11a of the pixel electrode 11, while a source 18s thereof is connected to the signal line 12, and a gate 18g thereof functions directly as an address line 13.

Figure 7:
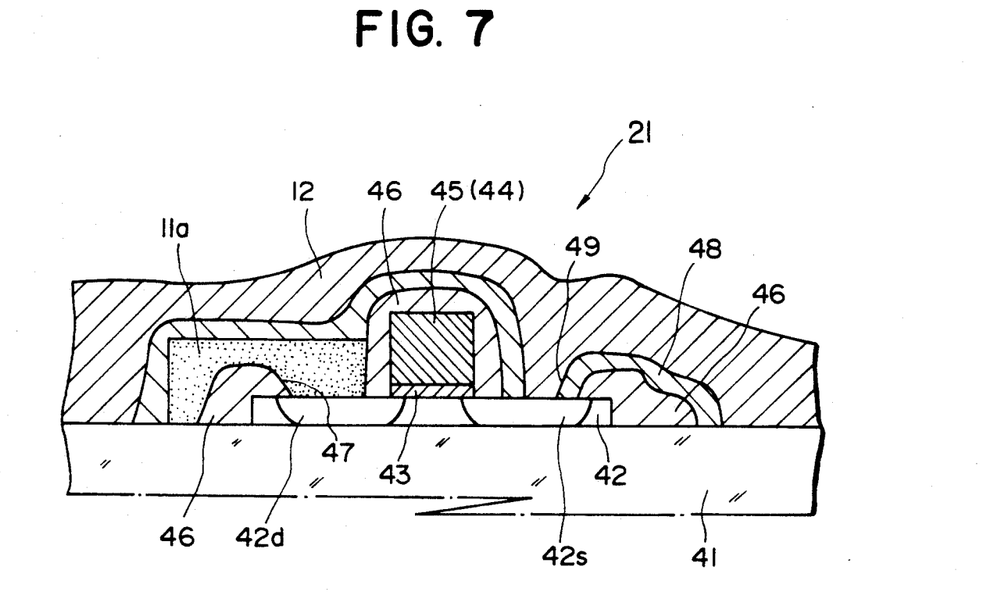
FIG. 7 is a cross-sectional view along line A—A in FIG. 4 showing an arrangement of layer elements according to the present invention.

With reference now to FIG. 7, a specific description will be provided with regard to the procedure of forming ultrathin film transistors 31, pixel electrodes 11 and signal lines 13 in the second embodiment of the invention.

Initially, a first-layer semiconductor film 42 of polycrystalline or amorphous silicon is formed on an insulator substrate 41 of glass or the like in a direction of a signal line 12 which is to be formed later, and a gate electrode 45 to function later as an address line 13 is formed on the gate portion of the semiconductor thin film 42 through a gate insulator film 43 of silicon dioxide (SiO$_2$) or the like. The gate electrode 45 is composed of a second layer semiconductor film, such as an impurity-doped polycrystal silicon film 44. Two regions on both sides of the gate electrode 45 of the semiconductor thin film 42 are formed as a source region 42s and a drain region 42d, respectively, and at least a gate portion is present under the signal line 12, as will be described later.

Subsequently, an insulator layer 46 of silicon dioxide or the like is formed, and then a contact hole 47 is formed in the insulator layer 46 at a position opposed to the drain region 42d. Thereafter, a pixel electrode 11 is formed in such manner that a portion 11a is connected via the contact hole 47 to the drain region 42d. After an interlayer insulator film 48 of silicon dioxide or the like is formed, contact holes 49 are formed in the interlayer insulator film 48 and the aforementioned insulator layer 46 at positions opposed to the source region 42s. A signal line 12 of aluminum is formed in a manner to be connected to the source region 42s.

Although not shown, an insulator substrate with transparent electrodes formed on its entire inner surface is disposed opposite to the insulator substrate 41 and a liquid crystal material is sealed in between the two substrates to constitute a desired display panel.

Thus, according to the above-described embodiment where switching transistors for driving the pixels are composed of high-mobility ultrathin film transistors 31, the ratio W/L need not be set to a great value despite lowering of the on-resistance. Therefore, the address lines 13 can be shaped linearly while the first-layer semiconductor thin films 42 constituting the ultrathin film transistors 31 are formed under the signal lines 12, whereby the aperture ratio of the pixels can be raised to a maximum permissible value with respect to the design rule.

The foregoing embodiments are also effective in applications in which the pixel area is decreased as a result of a progression toward higher resolution.

The exemplary procedure described in relation to the embodiment of FIG. 7 provides that the signal line 12 of aluminum is formed after completion of the pixel electrode 11. However, this procedure may also be reversed so as to form the pixel electrode 11 after the signal line 12 is formed.

Although other modifications and changes may be suggested by those skilled in the art, it is the intention of the inventor to embody within the patent warranted hereon all changes and modifications as reasonably and properly come within the scope of his contribution to the art.

I claim:

1. A liquid crystal display device, comprising:
   a plurality of pixels arrayed in a matrix, each pixel having:
      a transparent pixel electrode, and
      a switching device for driving each of the pixels, said switching device being formed under a signal line;
   a plurality of signal lines, each signal line being comprised of the signal line for supplying a signal voltage to each of an electrode of the switching device, and extending over a portion of the transparent pixel electrode; and
   a plurality of address lines connected to rows of said pixels in said matrix.

2. A liquid crystal display unit as claimed in claim 1, wherein said switching device of each pixel is a thin film transistor.

3. A liquid crystal display unit as claimed in claim 2, wherein said thin film transistor of each pixel has a drain region, said drain region of each transistor being electrically connected to a portion of a corresponding one of said pixel electrodes under a respective one of said signal lines.

4. A liquid crystal display unit as claimed in claim 2, wherein said thin film transistor of each pixel has a gate region, said gate region of each transistor being disposed under a corresponding one of said address lines.

5. A liquid crystal display unit as claimed in claim 2, wherein said thin film transistor of each pixel has a source region, said source region of each of said transistors being disposed under and connected electrically to a corresponding one of said signal lines.

6. A liquid crystal display unit as claimed in claim 1, wherein one of said signal lines is disposed along side each column of said matrix of pixels.

7. A liquid crystal display unit as claimed in claim 1, wherein one of said address lines is disposed along side each row of said matrix of pixels.

8. A liquid crystal display unit as claimed in claim 2, wherein said thin film transistor of each pixel is an ultrathin film transistor having a high mobility.

9. A liquid crystal display device, comprising:
   a plurality of pixels arranged in a matrix, each pixel comprising:
      a picture element electrode,
      a storage capacitor for holding a signal voltage to be applied to the picture element electrode and
      a switching transistor connected to the picture element electrode and a switching transistor connected to the picture element electrode, said switching transistor having a gate electrode, a gate insulating layer, and a semiconductor thin film defining a source, channel, and drain regions of the transistors;
   first signal lines connected to supply a first signal to each of odd rows of said pixels in said matrix;
   second signal lines connected to supply a second signal to each of even rows of said pixels in said matrix;
   address lines connected to select alternate rows of said pixels in said matrix; and
   electrode leads disposed between two adjacent address lines, each electrode lead defining one of electrodes of the storage capacitor and being connected commonly to the adjacent rows of the pixels.

10. A liquid crystal display unit as claimed in claim 9, wherein said electrode leads receive a fixed potential.

11. A liquid crystal display device as claimed in claim 9, wherein said switching transistor is formed under the first or second signal lines.

12. A liquid crystal display device as claimed in claim 9, wherein said storage capacitor is formed by the electrode lead, an extension of the gate insulation film, and an extension of the semiconductor thin film.

13. A device as claimed in claim 1, further comprising a storage capacitor having a pair of terminals, one terminal being connected to the respective switching device.

14. A device as claimed in claim 13, wherein said storage capacitor is formed between each of a portion of the transparent pixel electrode and a portion of one of the plurality of address lines.

15. A liquid crystal display device, comprising:
   a plurality of pixels arranged in a matrix, each pixel comprising a picture electrode, a switching transistor electrically connected to the picture element electrode, and a storage capacitor for holding a signal voltage to be applied to the picture element electrode;
   address lines associated with rows of the pixels in the matrix; and
   signal lines associated with columns of the pixels in the matrix, each signal line being formed over the switching transistor, wherein said picture element electrode and said signal line associated with it are situated in overlapping relationship with one another.

16. A liquid crystal display device as claimed in claim 15, wherein said signal line extends over a portion of the picture element electrode.

17. A liquid crystal display device, comprising:

a plurality of pixels arranged in a matrix, each pixel comprising a picture electrode, a switching transistor electrically connected to the picture element electrode, and a storage capacitor for holding a signal voltage to be applied to the picture element electrode;

address lines associated with rows of the pixels in the matrix; and signal lines associated with columns of the pixels in the matrix, each signal line being formed over the switching transistor, said signal lines comprising a first signal line for supplying a first signal to odd-numbered rows of the pixels, and a second signal line for supplying a second signal to even-numbered rows of the pixels, said first and second signal lines being disposed in both sides of the pixels.

18. A liquid crystal display device, comprising:

a plurality of pixels arranged in a matrix, each pixel comprising a picture electrode, a switching transistor electrically connected to the picture element electrode, and a storage capacitor for holding a signal voltage to be applied to the picture element electrode;

address lines associated with rows of the pixels in the matrix; and signal lines associated with columns of the pixels in the matrix, each signal line being formed over the switching transistor, said switching transistor comprising a semiconductor thin film which defines source, channel, and drain regions of the transistor;

an electrode lead disposed between two adjacent address lines, each electrode lead defining one electrode of the storage, said storage capacitor being formed between said electrode lead and an extension of the semiconductor thin film of the switching transistor, said switching transistor comprising an insulating film deposited on the semiconductor thin film, said insulating film defining a dielectric material for the storage capacitor.

* * * * *